United States Patent
Chaudhuri et al.

(10) Patent No.: US 7,562,067 B2
(45) Date of Patent: Jul. 14, 2009

(54) SYSTEMS AND METHODS FOR ESTIMATING FUNCTIONAL RELATIONSHIPS IN A DATABASE

(75) Inventors: Surajit Chaudhuri, Redmond, WA (US); Venkatesh Ganti, Redmond, WA (US); Kaushik Shriraghav, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 278 days.

(21) Appl. No.: 11/123,901

(22) Filed: May 6, 2005

(65) Prior Publication Data

US 2006/0282436 A1    Dec. 14, 2006

(51) Int. Cl.
*G06F 17/30* (2006.01)
*G06F 7/00* (2006.01)
*G06F 17/00* (2006.01)

(52) U.S. Cl. .......................... 707/2; 707/100
(58) Field of Classification Search ................. 707/100, 707/2
See application file for complete search history.

(56) References Cited

U.S. PATENT DOCUMENTS

| | | | |
|---|---|---|---|
| 5,548,754 A * | 8/1996 | Pirahesh et al. | 707/2 |
| 5,548,758 A * | 8/1996 | Pirahesh et al. | 707/2 |
| 5,761,653 A * | 6/1998 | Schiefer et al. | 707/2 |
| 5,899,992 A * | 5/1999 | Iyer et al. | 707/7 |
| 5,995,957 A * | 11/1999 | Beavin et al. | 707/2 |
| 6,272,487 B1 * | 8/2001 | Beavin et al. | 707/2 |
| 6,381,601 B1 * | 4/2002 | Fujiwara et al. | 707/7 |
| 6,457,014 B1 * | 9/2002 | Parker | 707/102 |
| 6,629,095 B1 * | 9/2003 | Wagstaff et al. | 707/5 |
| 6,763,359 B2 * | 7/2004 | Lohman et al. | 707/102 |
| 7,383,246 B2 * | 6/2008 | Lohman et al. | 707/2 |
| 2002/0198867 A1 * | 12/2002 | Lohman et al. | 707/3 |
| 2004/0249810 A1 * | 12/2004 | Das et al. | 707/5 |
| 2005/0097072 A1 * | 5/2005 | Brown et al. | 707/1 |
| 2005/0097078 A1 * | 5/2005 | Lohman et al. | 707/2 |
| 2005/0278357 A1 * | 12/2005 | Brown et al. | 707/100 |
| 2006/0047636 A1 * | 3/2006 | Mohania et al. | 707/3 |
| 2008/0177722 A1 * | 7/2008 | Lohman et al. | 707/4 |

OTHER PUBLICATIONS

Colossi, Nathan, et al., "Relational Extensions For OLAP", IBM Systems Journal, vol. 41, No. 4, © 2002, pp. 714-731.*
Chaudhuri, Surajit, et al., "Random Sampling for Histogram Construction: How Much is Enough?", SIGMOD '98, Seattle, WA, © 1998, pp. 436-447.*
Chaudhuri, Surajit, et al., "On Random Sampling Over Joins", SIGMOD '99, Philadelphia, PA, © 1999, pp. 263-274.*
Ilyas, Ihab F., et al., "CORDS: Automatic Discovery of Correlations and Soft Functional Dependencies", SIGMOD 2004, Paris, France, Jun. 13-18, 2004, pp. 1-12.*
Stillger, Michael, et al., "LEO—DB2's LEarning Optimizer", Proceedings of the 27th VLDB Conference, Rome, Italy, © 2001, p. 19-28.*

(Continued)

*Primary Examiner*—Robert Stevens
(74) *Attorney, Agent, or Firm*—Lee & Hayes, PLLC

(57) ABSTRACT

A system that facilitates estimating functional relationships associated with one or more columns in a database comprises a sampling component that receives a random sample of records within the database. An estimate generator component calculates an estimate of strength of functional relationships based at least in part upon the received samples. For example, the estimate generator component can calculate an estimate of strength of a column as a key column based at least in part upon the received samples.

14 Claims, 10 Drawing Sheets

OTHER PUBLICATIONS

Ilyas, Ihab F., et al., "CORDS: Automatic Generation of Correlation statistics in DB2", Proceedings of the 30th VLDB Conference, Toronto, Canada, Aug. 29-Sep. 3, 2004, pp. 1341-1344.*

Tan, Pang-Ning, et al., "Selecting the Right Interestingness Measure for Association Patterns", SIGKDD '02, Edmonton, Alberta, Jul. 23-26, 200, pp. 32-41.*

Ilyas, Ihab F., et al., "Automatic Relationship Discovery in Self-Managing Database Systems", ICAC '04, May 17-18, 2004, pp. 340-341.*

Netz, Amir, et al., "Integrating Data Mining with SQL Databases: OLE DB for Data Mining", Proc. of the 17th International Conference on Data Engineering, Heidelberg, Germany, Apr. 2-6, 2001, pp. 379-387.*

Lipton, Richard J., et al., "Practical Selectivity Estimation Through Adaptive Sampling", Proc. of the 1990 ACM SIGMOD International Conf. on Management of Data, Atlantic City, NJ, May 23-26, 1990, pp. 1-11.*

Whang, Kyu-Young, et al., "A Linear-Time Probabilistic Counting Algorithm for Database Algorithms", TODS, vol. 15, Issue 2, Jun. 1990, pp. 208-229.*

Ilyas, Ihab F., et al., "CORDS: Automatic Generation of Correlation Statistics in DB2", Proc. of the 30th VLDB Conf., Toronto, Canada, © 2004, pp. 1341-1344.*

R. Cavallo, et al. The Theory of Probabilistic Databases. In proceedings of the 13th International Conference on Very Large Data Bases, pp. 71-81, 1987.

M. Charikar, et al. Towards estimation error guarantees for distinct values. In Proceedings of the Nineteenth ACM SIGMOD-SIGACT-SIGART Symposium on Principles of Database Systems, May 15-17, 2000, Dallas, Texas, USA, pp. 268-279, 2000.

S. Chaudhuri, et al. On random sampling over joins. In SIGMOD, 1999.

C. Giannella, et al. On approximation measures for functional dependencies. Information Systems, 2004.

L. Goodman, et al. Measures of associations for cross classifications. Journal of the American Statistical Association, 49:732-764, 1954.

Y. Huhtala, et al. Efficient discovery of functional and approximate dependencies using partitions. In In proceedings of the 14th international conference on data engineering (ICDE), pp. 392-401, Orlando, FL, Feb. 1998.

I. Ilyas, et al. Cords: Automatic discovery of correlations and soft functional dependencies. In Proceedings of the 2004 ACM SIGMOD international conference on Management of data, 2004.

J. Kivinen, et al. Approximate infereence of functional dependencies from relations. Theoretical Computer Science, 149(1):129-149, Sep. 1995.

H. Mannnila, et al. Algorithms for inferring functional dependencies. Data and Knowledge Engineering, 12(1):83-99, Feb. 1994.

* cited by examiner

SYSTEMS AND METHODS FOR ESTIMATING FUNCTIONAL RELATIONSHIPS IN A DATABASE

TECHNICAL FIELD

The subject invention relates generally to database, and more particularly to estimating strength of functional relationships within databases.

BACKGROUND OF THE INVENTION

Electronic storage mechanisms have enabled accumulation of massive amounts of data. For instance, data that previously required volumes of books for recordation can now be stored electronically without expense of printing paper and with a fraction of physical space needed for storage of paper. In one particular example, deeds and mortgages that were previously recorded in paper volumes can now be stored electronically. Moreover, advances in sensors and other electronic mechanisms now allow massive amounts of data to be collected and stored. For instance, GPS systems can determine location of an individual or entity by way of satellites and GPS receivers, and electronic storage devices connected thereto can then be employed to retain locations associated with such systems. Various other sensors and data collection devices can also be utilized for obtainment and storage of data.

Database systems are often employed for storage and organization of data, wherein such databases can be queried by users to retrieve desirable data. Poor data quality is a well-recognized problem in database applications, including inconsistencies in data as well as missing values. Tasks performed over such data can be associated with high expense and may operate tediously due to poor data quality. In an exemplary database system, relational databases include index keys that are employed in connection with searching for data and analyzing data. For instance, a column can include a social security number, and such column can be labeled as a key due to uniqueness of the social security numbers. Thus, if a user were to search for an individual based upon social security number, the user would be able to quickly locate desired information. Due to improper user input, corruption of a database, and the like, columns can become poor for utilization as keys. For example, due to user input error a social security number can be repeated several times throughout a column within a database. Accordingly, if the database is searched using such a column and social security number, a user will be provided with a plurality of returned records. The user will then have to make determinations as to which record is relevant. If duplicity problems such as that described above are commonplace within the column, then such column may not be a desirable to utilize as a key.

In another example, a hospital can include a database that contains information relating to patients that have been provided services. Patients whose names are difficult to discover often are entered into a database under a common name, such as "John Doe" or "Jane Doe." Thus, searching by the name column for "John Doe" may prove to be fruitless, as hundreds if not thousands of records can be provided to a user. However, outside of such a default value, the name column may be quite useful as a key column. More particularly, the names "John Doe" and "Jane Doe" may be the only duplicative names within a column, thereby rendering such column highly useful as a key column. Estimating a strength of such columns as key columns, however, has proven to be a difficult task. For instance, some conventional systems analyze each record within the database in connection with determining strength of a column as a key column. Such robust analysis, however, requires utilization of substantial time and resources, particularly in light of database systems that are rapidly increasing in size. Other conventional estimation systems are inadequate and associated with error that is too high to provide meaningful data relating to strength of functional relationships in data.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention relates to systems and/or methods that can be employed to estimate functional relationships within a database. In accordance with one aspect of the subject invention, a strength of a column as a key column can be estimated efficiently and with acceptable accuracy. Calculating such estimates can aid in a decision regarding manners in which to cleanse data as well as assist in comparing data sets to determine which data set is cleaner on average. To render estimation of strength of a functional relationship efficient, uniform random sampling is employed.

In accordance with one aspect of the subject invention, a sampling component can be utilized to receive a sample or samples from a database, and an estimate generator component can thereafter use such samples to generate an estimate of strength of a function dependency. For example, the estimate generator component can take into consideration whether a column within the database is associated with default values. More specifically, certain databases can employ default values for certain variables. For instance, hospitals can assign a name of "John Doe" to all male patients who cannot be immediately identified. Accordingly, there can be several duplicate records within a column. Searching over these duplicates can cause a substantial amount of overhead in some instances—so it may be desirable to not account for such default values. At other times, however, it may be more desirable to estimate strength of a functional relationship while accounting for default values.

In accordance with another aspect of the subject invention, a number or size of samples can be based at least in part upon various parameters. For instance, a number or size of samples can be a function of size of a database. Similarly, a number or size of samples can be a function of time allotted for estimating a functional relationship. In accordance with still yet another aspect of the subject invention, a number or size of samples can be based at least in part upon a threshold amount of error that is acceptable for a particular application. For example, an estimated strength can desirably be associated with a high probability that such estimate is within a threshold with respect to actual strength.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
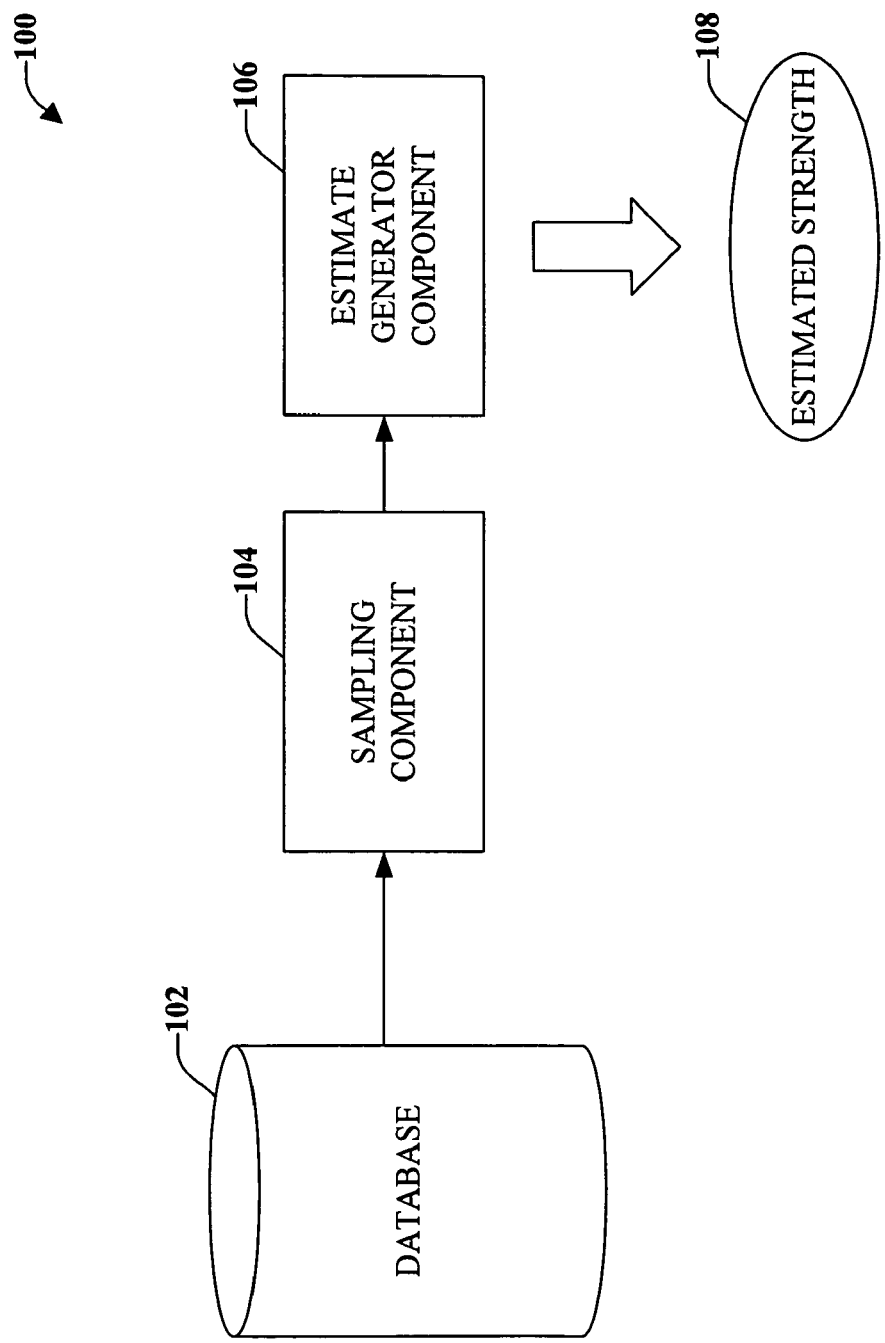
FIG. 1 is a high-level block diagram of a system that facilitates estimating strength of functional relationships within a database in accordance with an aspect of the subject invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers. The word "exemplary" is used herein to mean serving as an example, instance, or illustration. Any aspect or design described herein as "exemplary" is not necessarily to be construed as preferred or advantageous over other aspects or designs.

Furthermore, the subject invention may be implemented as a method, apparatus, or article of manufacture using standard programming and/or engineering techniques to produce software, firmware, hardware, or any combination thereof to control a computer to implement the disclosed invention. The term "article of manufacture" as used herein is intended to encompass a computer program accessible from any computer-readable device, carrier, or media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the subject invention.

The subject invention will now be described with respect to the drawings, where like numeral represent like elements throughout. Referring now to FIG. 1, a system 100 that facilitates estimating strength of functional relationships within data of a database is illustrated. The system 100 includes a database 102 that contains data organized by way of tables, wherein the tables include a plurality of columns and rows. In accordance with one aspect of the subject invention, one or more columns, rows, and/or attributes can be selected in association with determining an estimate of strength of a functional relationship associated therewith. In a particular example, a column that may be utilized as a key column can be selected to determine an estimate of strength of such column as a key column. Various disparate measures of strength can be defined and computed, and are described in more detail herein.

The database 102 is associated with a sampling component 104 that can receive random samples from a collection of records, wherein the samples relate to a column, row, attribute, and/or functional relationship whose strength is desirably estimated. For example, a number of samples received by the sampling component 104 can be based at least in part upon a size of the database 102. For example, the larger the database 102, the more samples that can be received by the sampling component 104. Furthermore, the number of samples that can be received by the sampling component 104 can be a function of execution time associated with collecting the samples and generating an estimate of strength of a functional relationship based upon such samples. Moreover, a number of samples received by the sampling component 104 can be based at least in part upon a defined upper bound of error. More particularly, as tolerance for error decreases, a number of samples received by the sampling component 104 increases.

The system 100 further includes an estimate generator component 106 that utilizes the samples and generates an estimate of strength 108 of a functional relationship based at least in part thereon. The estimate generator component 106 can compute estimates based upon various measures of strength. For example, the estimate generator component 106 can review the samples and provide a strength estimate based upon a number of duplicate records within the sample. In more detail, a greater number of duplicates in the sample can indicate a lower strength of functional relation. In another example, the estimate generator component 106 can consider a possibility of default entries in connection with estimating strength of a functional relationship (e.g., estimating strength of a column as a key column). Thus, simply because there are several duplicate entries does not necessarily indicate that a column is a poor column to employ as a key column. The estimated strength 108 output by the estimate generator component 106 can be employed to aid in selecting procedures to cleanse data within the database 102 and can be utilized in a comparison setting to determine which data sets within the database 102 are "cleaner" on average (e.g., are not duplicates and/or missing data). The estimated strength 108 can also be obtained in an efficient manner with relatively low error through utilization of one or more algorithms described in more detail below.

Figure 2:
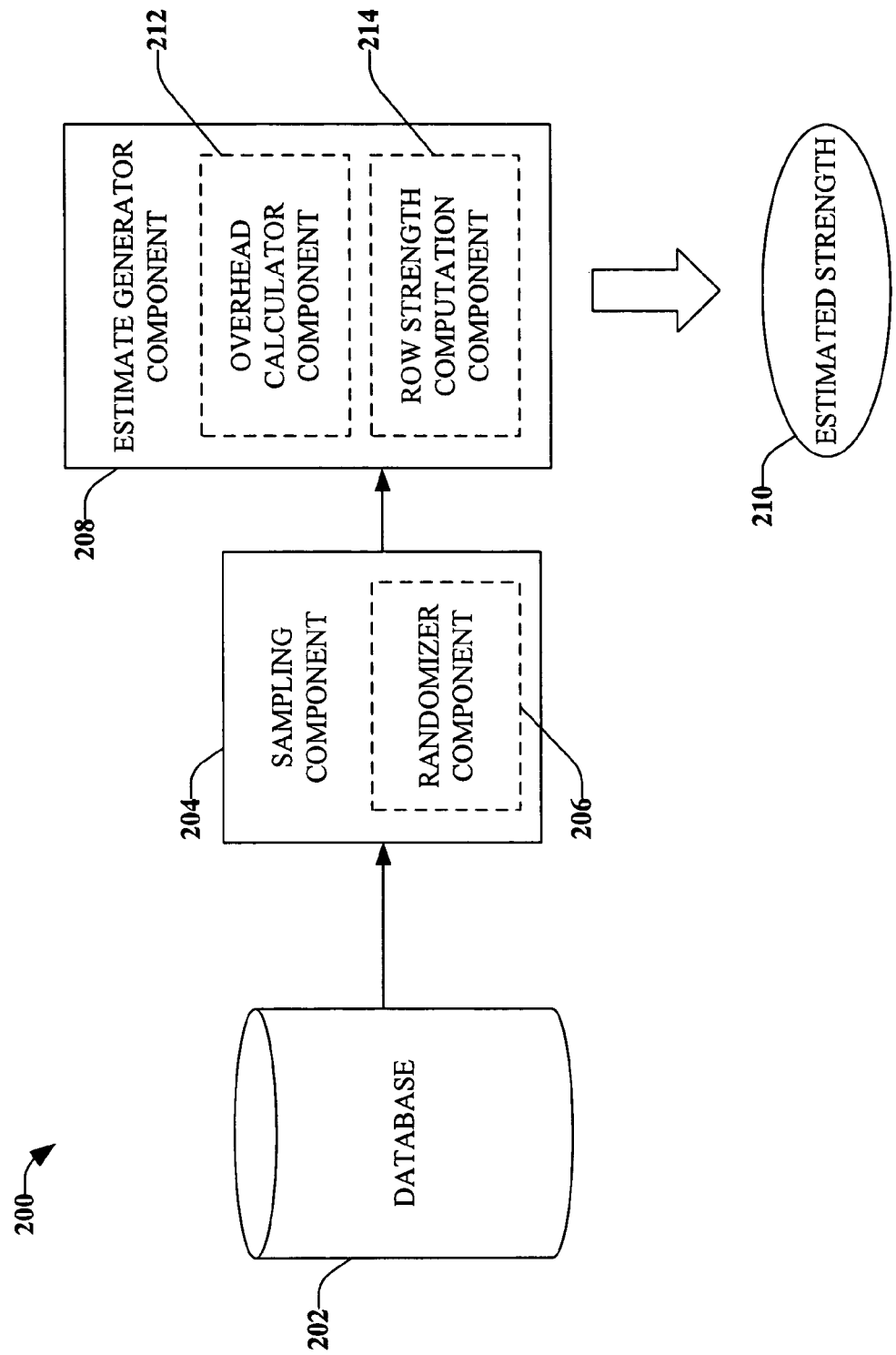
FIG. 2 is a block diagram of a system that facilitates efficiently estimating strength of key dependencies in accordance with an aspect of the subject invention.

Turning now to FIG. 2, a system 200 that facilitates estimating strength of key dependencies with respect to columns within a database is illustrated. The system 200 includes a database 202 that is utilized to store and organize data, for instance, through tables, columns, and rows. A sampling component 204 can be provided to obtain samples of records from the database 202 relating to a column, wherein the sampling component 204 employs uniform sampling techniques to retrieve records from the database 202. For instance, the sampling component 204 can be associated with a randomizer component 206 that enables uniform random acquisition of records from the database 202. The randomizer component 206 can employ any suitable algorithm to enable the sampling component 204 to receive samples from the database 202. For instance, the randomizer component 206 can employ algorithms that are pseudo-random rather than wholly random. The term "random", however, is intended to encompass pseudorandom sampling in connection with the system 200.

An estimate generator component 208 receives the samples from the sampling component 204 and generates an estimated strength associated with key dependencies (e.g., an estimate of how a column would perform as a key column). To generate the estimated strength 210, the estimate generator component 208 utilizes an overhead calculator component 212 and a row strength computation component 214. The estimate generator component 208 can consider a relation R with N rows that includes a column A. In accordance with one aspect of the subject invention, A can be labeled as a key if for any two tuples the following holds true: $t_1, t_2 \in R$, $t_1[A] \neq t_2[A]$. A pair of tuples $t_1, t_2 \in R$ causes a conflict if $t_1, [A]=t_2[A]$. A maximal subset of R that agree on A can be referred to as an A-group, and each value $i \in A$ defines an A-group, $g_i$. Cardinality for a set of tuples S can be denoted as |S|. Furthermore, $SJ_A(R)$ can be defined as $|R \bowtie_A R|$, and D can be defined as a number of distinct values in A.

The overhead calculator component 212 can be employed to calculate a measure of overhead that is associated with utilizing a column as a key column. For instance, if several duplicate records existed within the column, then an overhead associated with searching through the duplicate measures can be high. Similarly, if there are no duplicate records within a column, then overhead is low. One exemplary measure of overhead with respect to a column A is $$\text{Overhead}(A) = \frac{N}{SJ_A(R)},$$

where variables have been defined above. In other words, the defined measure is a ratio of N to self-join sizes of R with respect to A. The overhead calculator component 212 can be designed based upon such measure (or any other suitable measure of strength of key dependencies). For instance, the overhead calculator component 212 can utilize the following algorithm to estimate a measure of strength based at least in part upon samples received by the sampling component 204 from the database 202:

$$\text{Estimated Overhead}(A) = \frac{N}{\hat{SJ}_A(R)},$$

where $$\hat{SJ}_A(R) = \frac{1}{p^2} \cdot |S_{k,1} \bowtie_A S_{k,2}|,$$

p is a sampling fraction $$\left(\frac{k}{N}\right),$$

and $S_{k,1}$ and $S_{k,2}$ are two independent uniform random samples of size k drawn from the relation R. Accordingly, given a random collection of samples from the sampling component 204, the estimate generator component 208 can employ the overhead calculator component 212 to output the estimated strength 210 with respect to overhead associated with utilizing a column as a key column. The system 200 improves conventional systems/methodologies by enabling efficient calculation of the measure of overhead by way of random samples while still resulting in accurate estimates of strength.

The overhead calculator component 212 can further determine probabilities that the estimate is within a given percentage of a correct measure of strength. More particularly, the sampling fraction p can be selected to output the estimated strength 210 so that a probability of the estimated strength 210 being within a defined threshold is within a specified range. For a specific example, the sampling fraction p can be selected so that there is a ninety percent probability that the estimated strength 210 is within five percent of actual strength of a key dependency. The probabilities and proximity to actual strength of key dependencies can be selected by a user and/or automatically selected based at least in part upon an application in which the estimated strength 210 is to be employed.

As described above, the estimate generator component 202 can also include a row strength computation component 214 that can account for default values (e.g., "John Doe") when estimating strength of a functional relationship (e.g., a column as a key column). Such a measure of strength is hereinafter referred to as "row strength." In accordance with one aspect of the subject invention, strength of a row can be defined in a following manner:

$$\text{Row}(A) = \frac{D}{N},$$

where D is a number of "clean" rows (e.g., rows that have attributes that are not duplicated). Thus, a higher number indicates a greater amount of strength. An estimate of this strength can be defined as the following, where $|\hat{X}|$ is the strength estimate:

$$|\hat{X}| = |\hat{X}_{small}| + |\hat{X}_{large}|,$$

where $X_{small}$ corresponds to groups in R (typically very small groups) that can have at most one conflicting pair in a sample obtained by the sampling component 204, and $X_{large}$ corresponds to rows from larger groups that can have more than two conflicting rows in a sample obtained by the sampling component 204. In more detail, a set of rows desirably removed from R to make column A a key can be X, where X can be referred to as a "dirty" subset of R and R−X can be referred to as a clean subset of R. $S_k$ can be a uniform random sample obtained by the sampling component 204 and provided to the estimate generator component 208 consisting of k rows drawn with replacement from R. More formally, $X_{small}$ denotes a set of "dirty" rows in R that have either zero or one conflicting representative tuple pairs in a set of tuples S. For instance, g can be an A-group in R, and thus a subset of "dirty" rows from g is in $X_{small}$ if S includes at most two conflicting rows from g. $X_{large}$ includes remaining rows in X. In other words, $X_{large}$ includes a set of dirty rows that have more than one conflicting pair represented in S (e.g., conflicting groups in a sample whose sizes are greater than or equal to two represent $X_{large}$).

In order to obtain the estimated strength 210, $X_{small}$ and $X_{large}$ need to be estimated. With respect to $X_{small}$, a quadratic scaling factor can be employed to provide an upper bound for a number of "dirty" rows therein. In other words, $X_{small}$ is largest when each conflicting group in a base relation consists of exactly two conflicting tuples. It can thus be determined that an expected number of conflicting pairs detected in a sample provided by the sampling component 204 is $$\frac{k(k-1)}{N^2} \cdot |X_{small}|.$$

If $z_2$ is a number of conflicting groups of size two in a sample, then an estimate for a size of $X_{small}$ is as follows:

$$|\hat{X}_{small}| = z_2 \cdot \frac{N^2}{k(k-1)}.$$

It is understood that a definition of $X_{small}$ can be modified to include conflicting groups of size three or more, rather than simply including conflicting groups of size two, and the inventors of the subject invention have contemplated such modification together with other natural variations and/or modifications of estimating $X_{small}$.

$X_{large}$ can be estimated by way of calculating a number of dirty rows in each group $g_s$ in a sample. More particularly, an estimate of $X_{large}$ is a sum, linearly scaled up with the inverse of the sampling fraction, over all large groups in a sample provided by the sampling component 204. If $z_1$ is defined as a total number of "dirty" rows over all large groups in a sample, then an estimate for a size of $X_{large}$ is as follows:

$$|\hat{X}_{large}| = z_1 \cdot \frac{N}{k}.$$

Given estimates of sizes of $X_{small}$ and $X_{large}$, an estimate of X can be obtained and employed in connection with estimating strength of a column within the database 202, thus factoring in possibility of one or more default values within a column. In one example, a returned estimate can be of the form $$\left(1 - \frac{|\hat{X}|}{N}\right).$$

The estimated strength 210 can be obtained through utilization of samples, rather than requiring each record to be individually analyzed. Accordingly, efficiency associated with creating estimates of strength of functional relationships generally, and key dependencies in particular, is greatly enhanced.

Figure 3:
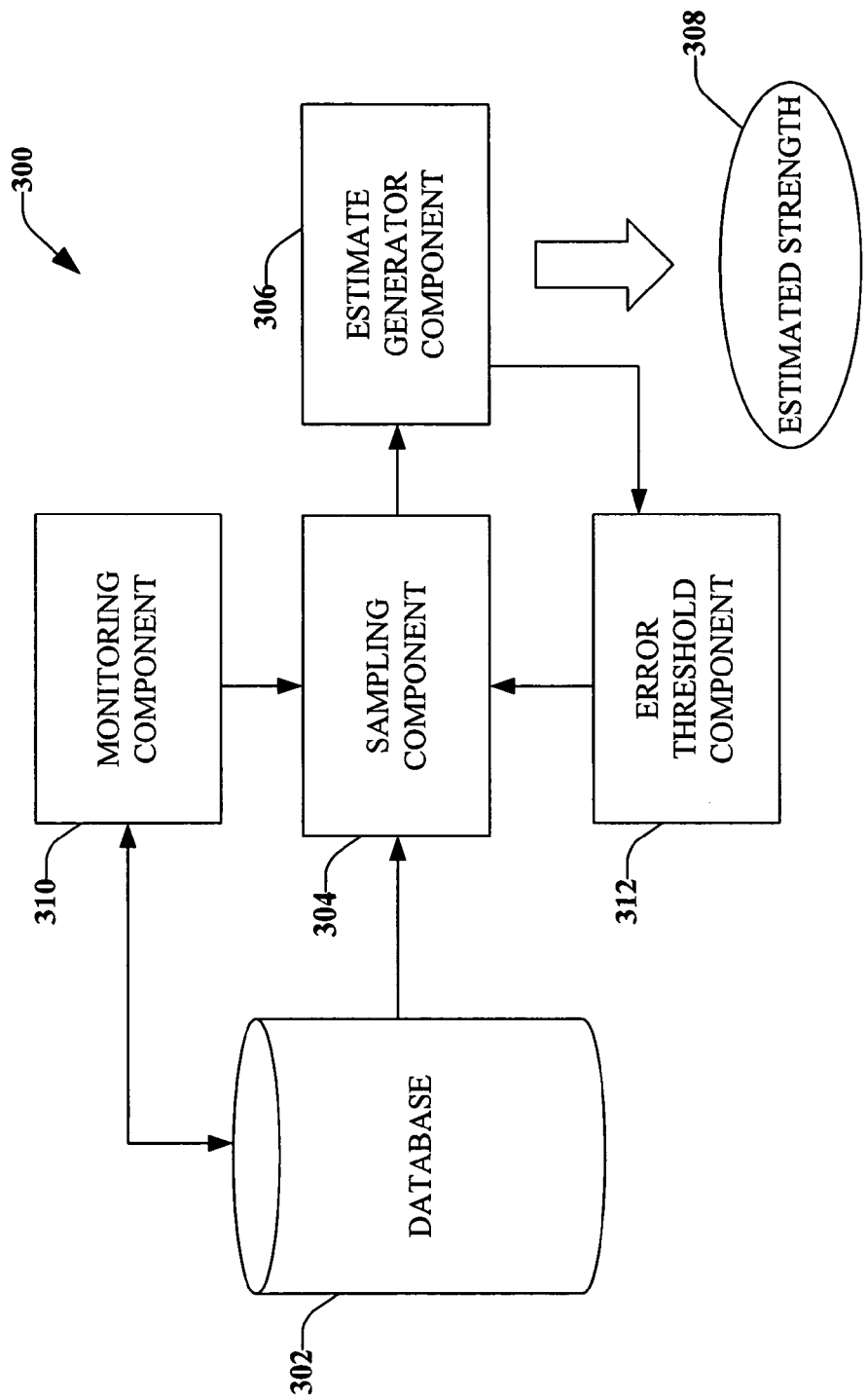
FIG. 3 is a block diagram of a system that facilitates determining a number or size of samples to be utilized in connection with estimating a functional relationship in accordance with an aspect of the subject invention.

Turning now to FIG. 3, a system 300 that facilitates generating an estimate with respect to functional relationships/dependencies relating to a database is illustrated. The system 300 includes a database 302 that is employed to store and organize data. For instance, the database 302 can be a relational database that organizes data by way of tables, wherein the tables include columns and rows. A sampling component 304 is communicatively coupled to the database 302, and retrieves a sample of contents of the database 302. For example, the sampling component 304 can retrieve a random or pseudorandom sampling of data relating to columns whose strength as a key column is desirably estimated.

An estimate generator component 306 can receive the samples from the sampling component 304, analyze the samples, and output an estimated strength 308 associated with a functional relationship. For instance, the estimate generator component 306 can employ one or more of the algorithms described above in accordance with outputting the estimated strength 308. Other suitable algorithms can also be employed by the estimate generator component 306. The estimated strength 308 can be output to a display component, such as a graphical user interface. Furthermore, the estimated strength 308 can be output audibly through utilization of speakers, and/or can be provided to a computing component for further processing and/or analysis.

In accordance with one aspect of the subject invention, a monitoring component 310 can be associated with the database 302 and the sampling component 304, and can be employed to monitor size of the database 302. More specifically, the monitoring component 310 can assist in determining a size of a sample set received from the database 302 based at least in part upon size of the database 302. For instance, if the database 302 significantly increases in size, it may be desirable to receive a greater sample size in order to provide the estimate generator component 306 with sufficient samples to output an acceptable estimate. For example, the monitoring component 310 can employ a ratio in connection with determining a sample size that the sampling component 304 should retrieve (e.g., 1% of a total size of the database 302). The monitoring component 310 can also be employed to monitor efficiency associated with calculating the estimated strength 308, and inform the sampling component 304 of a sample size to retrieve from the database 302 based at least in part upon the efficiency. For example, the monitoring component 310 can dictate that the estimated strength 308 be calculated within a threshold amount of time, and reduce a size of samples receivable by the estimate generator component 306 if computation of the estimated strength 308 requires a time greater than the threshold. Similarly, the monitoring component 310 can define a lower-bound threshold for a time taken by the estimate generator component 306 to compute the estimated strength. In more detail, the monitoring component 310 can cause the sampling component 304 to retrieve a larger sample size, thereby enabling the estimate generator component 306 to receive a sample of maximum size without causing the estimate generator component 306 to surpass the time threshold while computing the estimated strength 308.

The system can further include an error threshold component 312 that assigns a threshold of error that can be associated with the estimated strength 308. For instance, the error threshold component 312 can indicate that there should be a particular probability that the estimated strength be within a threshold percentage of actual strength associated with a column. In a more specific example, the error threshold component 312 can dictate that there be a ninety percent probability that the estimated strength 308 be within five percent of an actual strength. The error threshold component 312 can alter a size of a sample retrieved by the sampling component 304 to ensure that error associated with the estimated strength 308 is within a predefined threshold.

Figure 4:
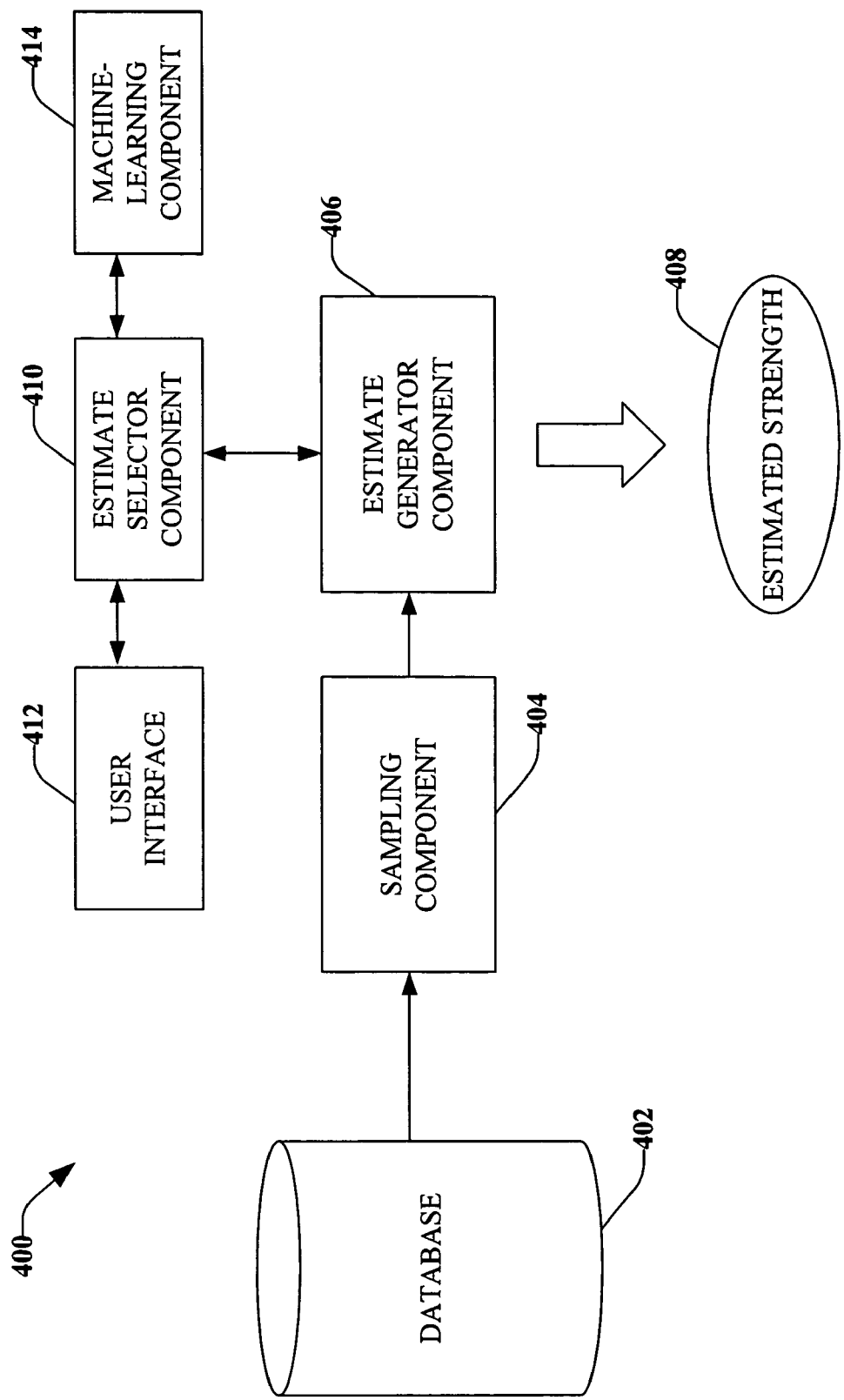
FIG. 4 is a block diagram of a system that facilitates selection of a measure of strength to estimate in accordance with an aspect of the subject invention.

Now referring to FIG. 4, a system 400 that facilitates estimating strength of key dependencies is illustrated. The system 400 includes a database 402 that stores data in a tabular format, wherein columns of such data can be utilized as keys. In particular, columns within the database 402 can be employed to index data therein. A sampling component 404 obtains random samples from the database and passes a collection of the random samples to an estimate generator component 406. The estimate generator component 406 can then output an estimated strength 408, wherein the estimated strength 408 provides an indication of strength of utilizing a column as a key column. The estimate generator component 406 can employ various algorithms to generate disparate estimates of strength. For instance, a first measure of strength can simply analyze for duplicate and/or damaged data records, without accounting for a possibility that default values are entered into the database 402. A second measure of strength of key dependencies can account for existence of default values, and provide a strength estimate based at least in part upon such accounting.

An estimate selector component 410 can be employed to facilitate selection of a measure of strength to be calculated by the estimate generator component 406. For instance, the estimate selector component 410 can be communicatively coupled with a user interface component 412, thereby enabling a user to select a type of measure of strength to be estimated by the estimate generator component 406. For instance, the user interface 412 can be, but is not limited to being, a keyboard, a mouse, a pressure-sensitive screen, a graphical user interface, a microphone, and voice recognition software. Thus, depending upon context in which the database 402 is being employed, a user can select a type of measure of strength desirably returned.

The estimate selector component 410 can further be associated with a machine-learning component 414 that can analyze contextual data in light of historical data to generate inferences regarding which type of measure of strength to be estimated by the estimate generator component 406. In accordance with one aspect of the subject invention, the machine-learning component 414 can employ artificial intelligence based systems (e.g., explicitly and/or implicitly trained classifiers) in connection with performing inference and/or probabilistic determinations and/or statistical-based determinations with respect to selection of a type of measure of strength to estimate. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject invention. For example, over time, selections of measures of strength associated with the estimate generator component 406 can be monitored and associated with various contexts. The machine-learning component 414 can recognize such contexts and automatically select a measure of strength for the estimate generator component 406 to estimate.

Referring now to FIGS. 5-8, methodologies in accordance with the subject invention will now be described by way of a series of acts. It is to be understood and appreciated that the subject invention is not limited by the order of acts, as some acts may, in accordance with the subject invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 5:
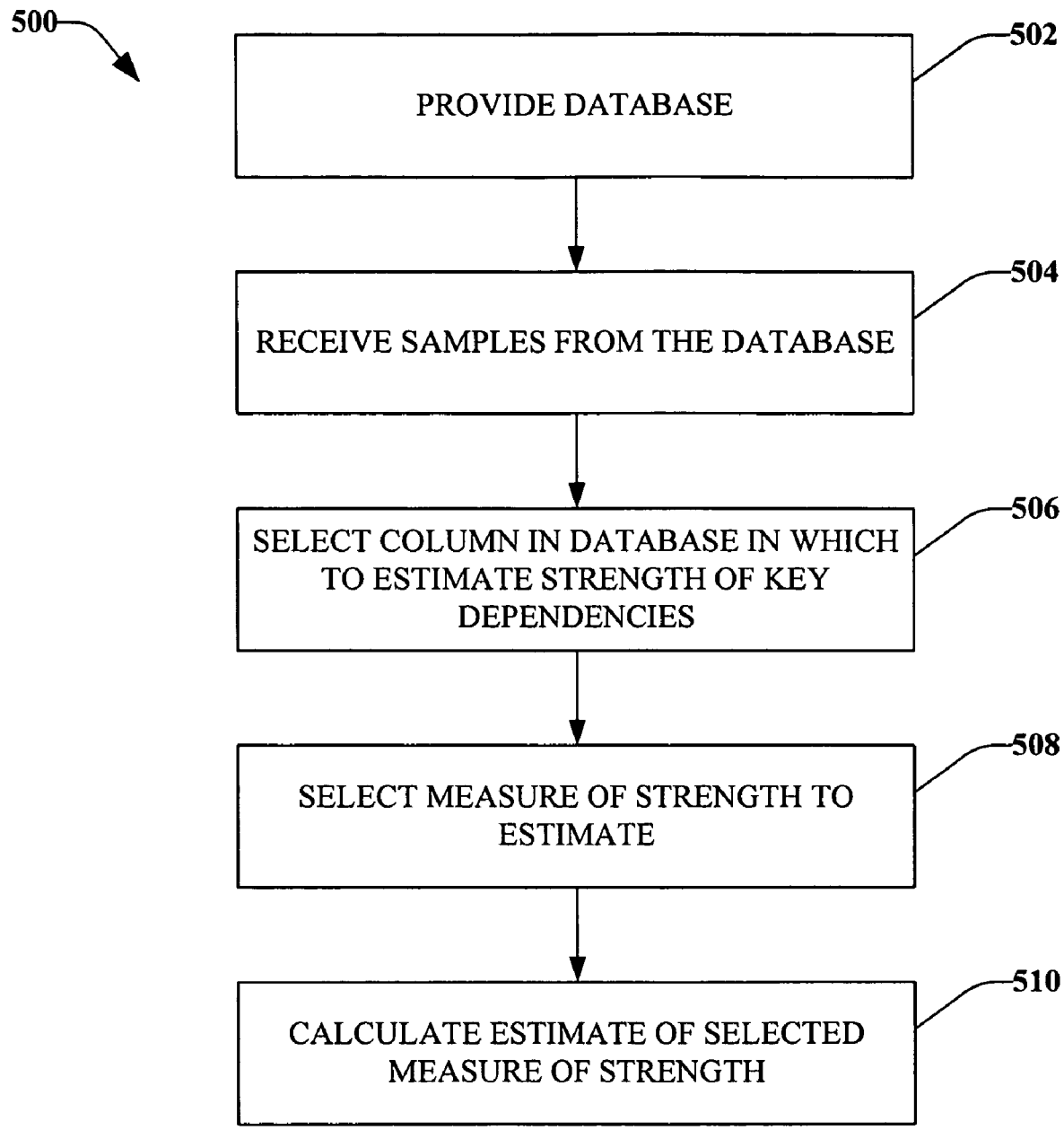
FIG. 5 is a representative flow diagram illustrating a methodology for estimating strength of a functional relationship in accordance with an aspect of the subject invention.

Turning solely to FIG. 5, a methodology 500 for estimating strength of a functional relationship (e.g., key dependencies) is illustrated. At 502, a database is provided, wherein the database includes one or more columns that can be employed to index content of the database. For instance, the database can include information relating to patients in a hospital, and a column therein can include names of those who were provided services at such hospital. The names can be utilized as an index to search over other related information within the database. For example, a search over a name can provide a user with date of birth, data of admission, and the like. It may be undesirable to utilize such column as an index or key, however, if several duplicates existed within the name column.

At 504, samples are received from the database, wherein the samples relate to a column that is desirably analyzed. In accordance with one aspect of the subject invention, the samples can be random samples obtained from the database, and a size and number of such samples can be based at least in part upon size of the database, error threshold associated with obtaining an estimate, and the like. At 506, a column in the database in which to estimate strength of key dependencies is selected. The column can be manually selected by a user by way of a user interface and/or automatically selected by a computing component, intelligent or otherwise. At 508, a measure of strength to estimate with respect to the column is selected. For example, a first measure of strength can take into account a possibility of default values within a column, while a second measure of strength does not take into account such possibility. At 510, an estimate of the selected measure of strength is calculated. Algorithms that can be employed to estimate such measures are provided and described in detail above.

Figure 6:
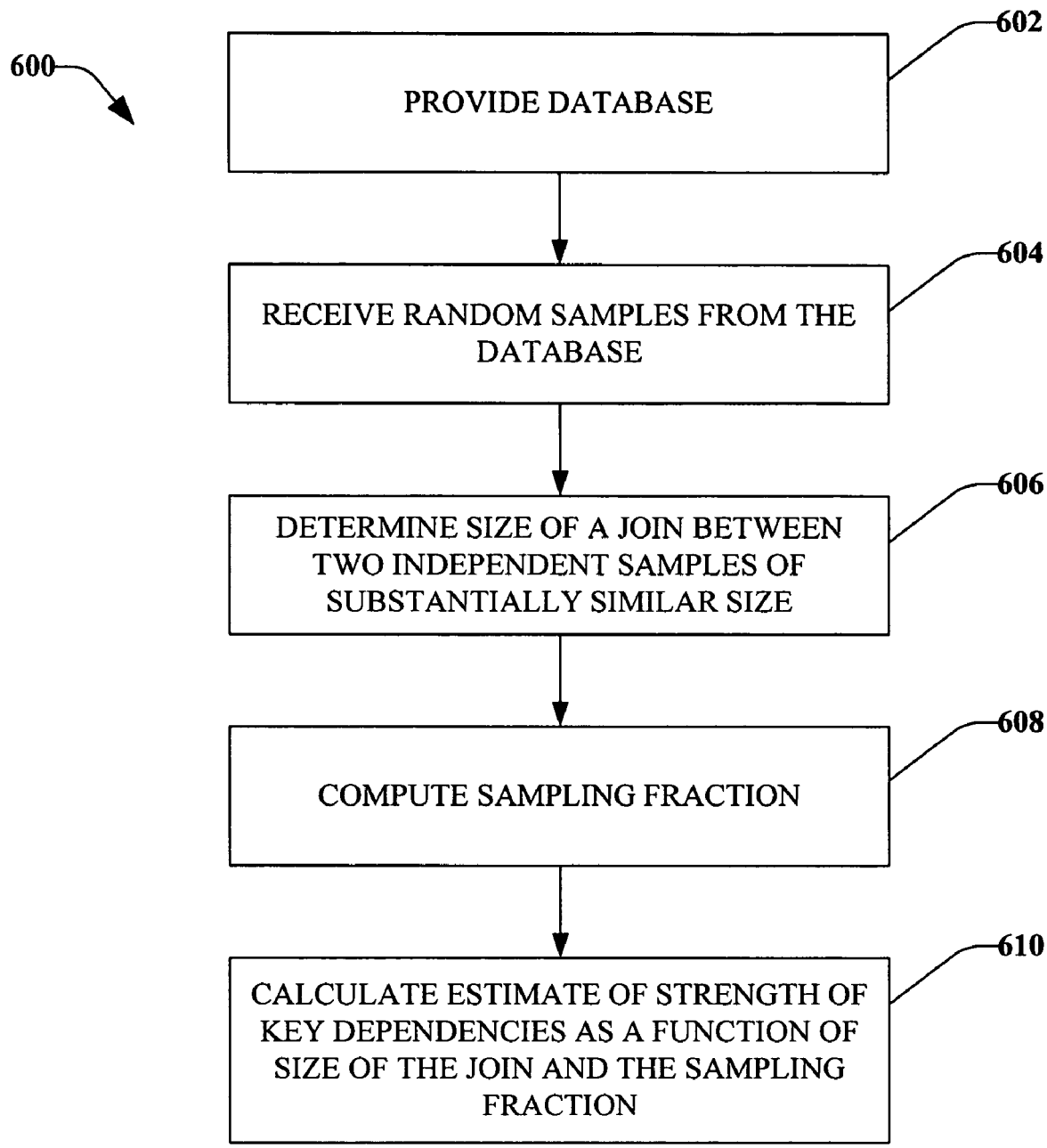
FIG. 6 is a representative flow diagram illustrating a methodology for calculating an estimate of strength of key dependencies in accordance with an aspect of the subject invention.

Now turning to FIG. 6, a methodology 600 for calculating a measure of strength of key dependencies is illustrated. At 602, a database is provided, and at 604 random samples are received from the database. Such random samples can be explicitly requested by a sampling component and/or automatically provided to an estimation system/component. At 606, a size of a join between two independent samples of substantially similar size is determined, and at 608, a sampling fraction is computed. At 610, an estimate of strength of key dependencies is calculated as a function of size of the join and the sampling fraction.

Figure 7:
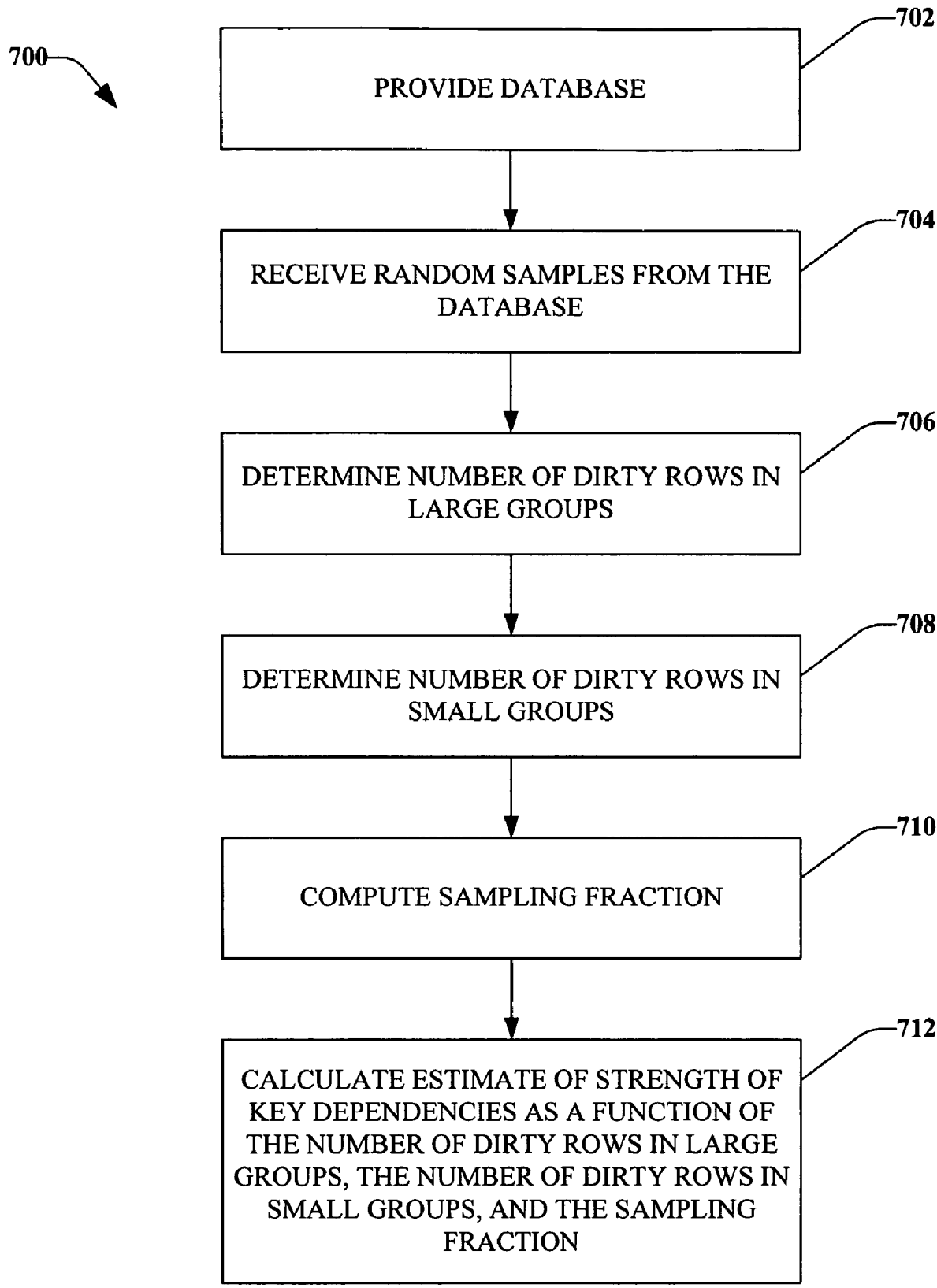
FIG. 7 is a representative flow diagram illustrating a methodology for estimating strength of key dependencies in accordance with an aspect of the subject invention.

Referring now to FIG. 7, a methodology 700 for calculating an estimate of strength of a column as a key column is illustrated, wherein default values are taken into account when calculating the estimate. At 702, a database is provided, and at 704 random samples from the database are received. At 706, a number of "dirty" rows within large groups in the database is determined, wherein "dirty" rows are those that are associated with duplicates. At 708, a number of "dirty" rows in small groups are determined, and at 710 a sampling fraction is computed. At 712, an estimate of strength of key dependencies is calculated as a function of the number of "dirty" rows in large groups, the number of "dirty" rows in small groups, and the sampling fraction. Algorithms that can be employed in connection with computing such an estimate are described in more detail above.

Figure 8:
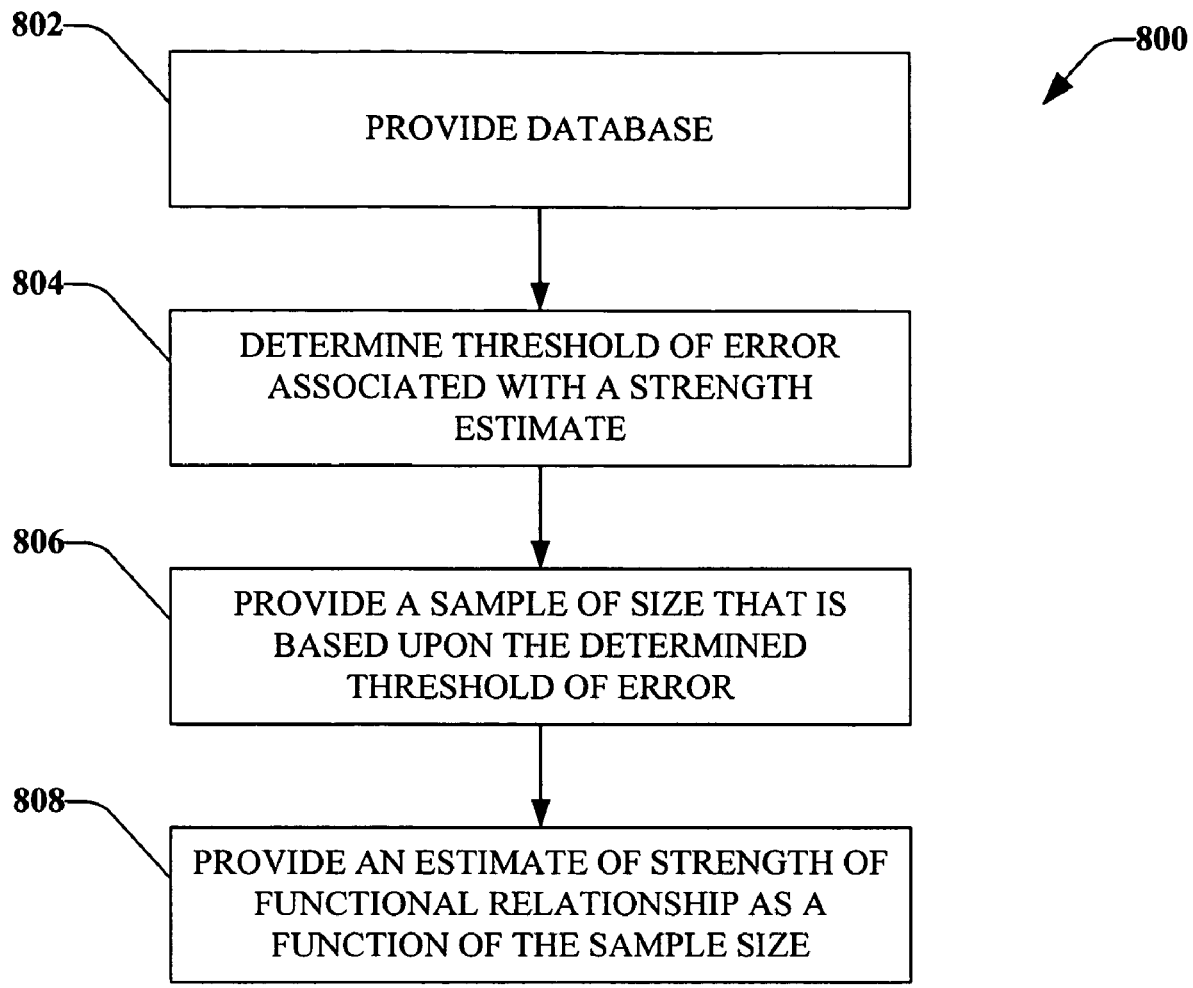
FIG. 8 is a representative flow diagram illustrating a methodology for generating an estimate of strength of a functional relationship as a function of a sample size in accordance with an aspect of the subject invention.

Now turning to FIG. 8, a methodology 800 for providing a sample size that accords with an error tolerance is illustrated. At 802, a database is provided, and at 804 a threshold of error associated with a strength estimate is determined. For instance, it can be specified that an estimate of strength of a functional relationship should be, at a ninety percent probability, within five percent of an actual measure of strength. At 806, a sample associated with a size that is based upon the threshold of error is provided to an estimating component. At 808, an estimate of strength of functional relationship is provided as a function of the sample size. While not explicitly shown with respect to the methodology 800, it is understood that a size of the sample can also be based at least in part upon a size of the database, a desired efficiency in computing the estimate, and the like.

Figure 9:
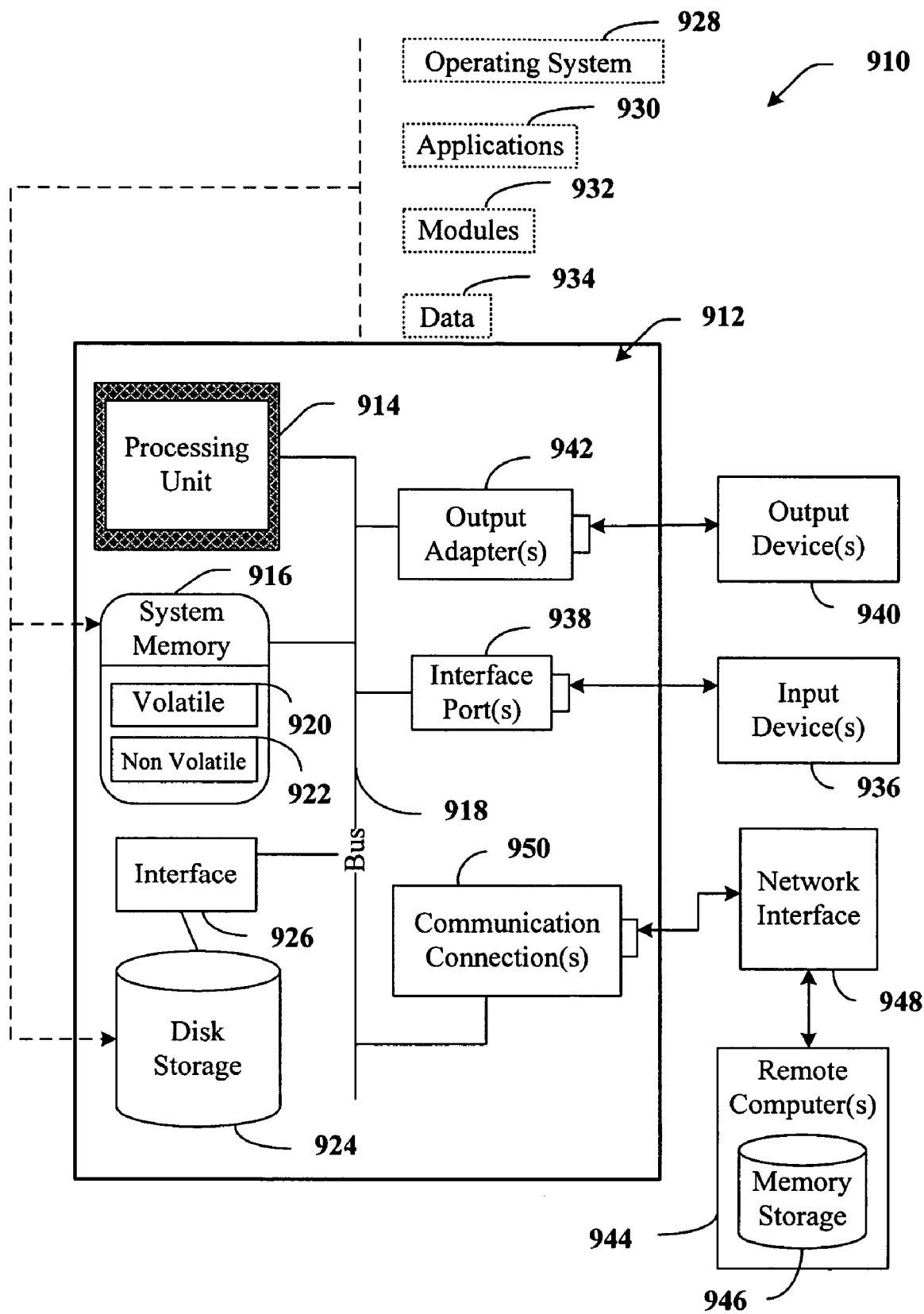
FIG. 9 is a schematic block diagram illustrating a suitable operating environment in accordance with an aspect of the subject invention.

In order to provide additional context for various aspects of the subject invention, FIG. 9 and the following discussion are intended to provide a brief, general description of a suitable operating environment 910 in which various aspects of the subject invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 910 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 9, an exemplary environment 910 for implementing various aspects of the invention includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI). The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/nonremovable, volatile/nonvolatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that the subject invention can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

Figure 10:
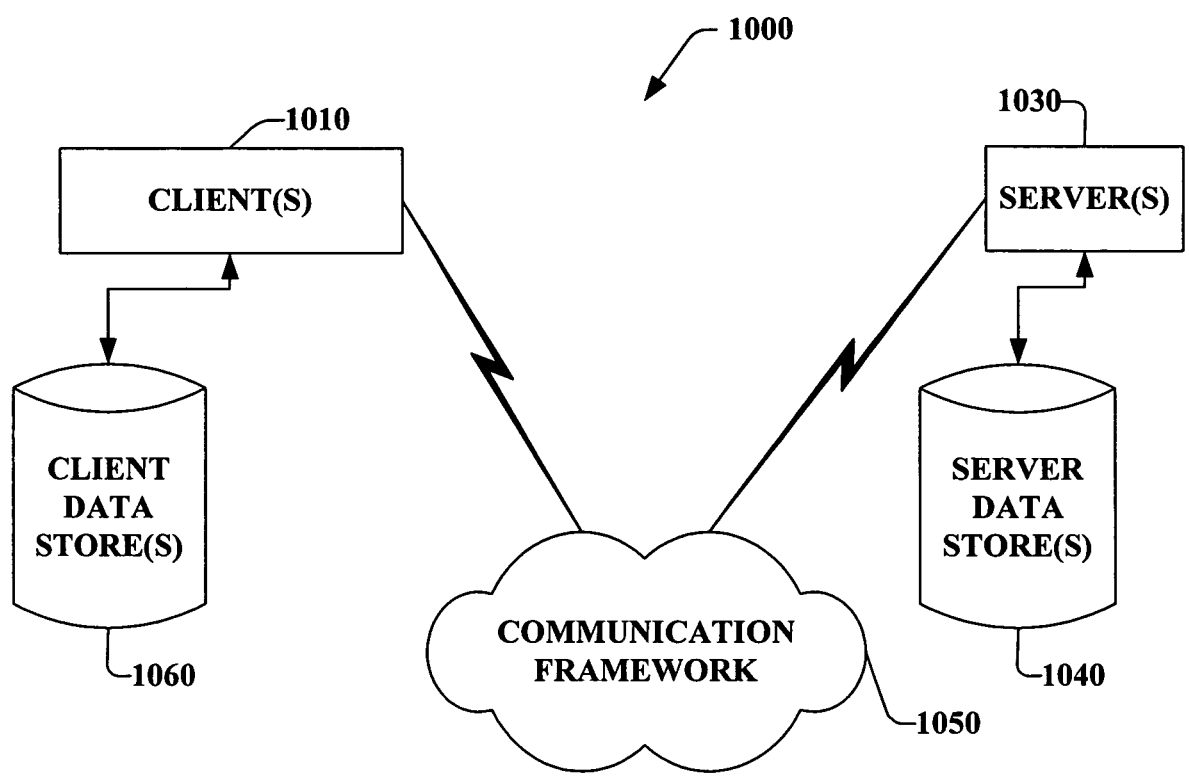
FIG. 10 is a schematic block diagram of a sample-computing environment with which the subject invention can interact.

FIG. 10 is a schematic block diagram of a sample-computing environment 1000 with which the subject invention can interact. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the subject invention, for example. One possible communication between a client 1010 and a server 1030 can be in the form of a data packet adapted to be transmitted between two or more computer processes. The system 1000 includes a communication framework 1050 that can be employed to facilitate communications between the client(s) 1010 and the server(s) 1030. The client(s) 1010 are operably connected to one or more client data store(s) 1060 that can be employed to store information local to the client(s) 1010. Similarly, the server(s) 1030 are operably connected to one or more server data store(s) 1040 that can be employed to store information local to the servers 1030.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates estimating functional relationships associated with one or more columns in a database, the system, comprising at least a processor executing the following components:

a sampling component that receives a random sample of records within the database;

an estimate generator component that calculates an estimate of strength of the functional relationships associated with the one or more columns based at least in part upon a subset of the received sample and a selected measure;

an estimate selector component that facilitates selection of a measure of strength to be calculated by the estimate generator component;

an overhead calculator component that estimates a measure of overhead associated with a column in the database by utilizing:

$$\text{Estimated Overhead}(A) = \frac{N}{\hat{S}J_A(R)},$$

where $$\hat{S}J_A(R) = \frac{1}{p^2} \cdot |S_{k,1} \bowtie_A S_{k,2}|,$$

p is a sampling fraction $$\left(\frac{k}{N}\right),$$

N is a number of rows that have a column A in a relation R, and $S_{k,1}$ and $S_{k,2}$ are two independent uniform random samples of size k drawn from the relation R;

a row strength computation component that estimates strength |X̃| of a column comprising one or more default values as a key column based at least on a number of clean records within the column in the database by utilizing:

$$|\hat{X}| = |\hat{X}_{small}| + |\hat{X}_{large}|$$

wherein, $X_{small}$ is a set of "dirty" rows in a relation R that have either zero or one conflicting representative tuple pairs in a set of tuples S, and $X_{large}$ corresponds to a set of "dirty" rows that have more than one conflicting pair represented in S;

the estimate generator component calculates an estimate of strength of a column as a key column as a function of the received samples utilizing the overhead calculator component, or the row strength computation component based at least on the selection of a measure of strength.

2. The system of claim 1, further comprising a randomization component that is employed to provide the sampling component with the random sample of records.

3. The system of claim 1, wherein the overhead calculator component utilizes a self-join algorithm in connection with estimating the measure of overhead.

4. The system of claim 3, further comprising an error threshold component that determines a number of sample records to provide to the sampling component based at least in part upon a threshold amount of error allowed for the estimate generator component.

5. The system of claim 1, wherein the estimate generator component employs a row strength computation component that estimates a number of clean records within a column in the database.

6. The system of claim 1, further comprising a monitoring component that determines a number of sample records to provide to the sampling component based at least in part upon size of the database.

7. The system of claim 1, further comprising monitoring component that determines a number of sample records to provide to the sampling component based at least in part upon a threshold performance associated with the estimate generator component.

8. The system of claim 1, wherein the estimate generator component utilizes the following algorithm in connection with calculating an estimate of strength of functional relationships:

$$|\hat{X}_{small}| = z_2 \cdot \frac{N^2}{k(k-1)},$$

where, N is a number of rows that have a column A in the relation R, $z_2$ is a number of conflicting groups of size two in the random sample, and k is a size of the random sample.

9. The system of claim 8, wherein the estimate generator component utilizes the following algorithm in connection with calculating an estimate of strength of functional relationships:

$$|\hat{X}_{large}| = z_1 \frac{N}{k},$$

where $z_1$ is a total number of "dirty" rows over all large groups in the sample.

10. The system of claim 1, further comprising a machine-learning component that generates inferences regarding a type of measure of strength to be estimated by the estimate generator component by analyzing contextual data and historical data.

11. A method for estimating strength of key dependencies in a database, comprising the following executable by a processor:

receiving random samples from the database, the samples are associated with a column comprising one or more default values associated therewith;

selecting a measure of strength to be estimated for assessing strength of the column as a key column;

estimating a measure of overhead associated with the column in the database by utilizing:

$$\text{Estimated Overhead}(A) = \frac{N}{\hat{SJ}_A(R)},$$

where $$\hat{SJ}_A(R) = \frac{1}{p^2} \cdot |S_{k,1} \bowtie_A S_{k,2}|,$$

p is a sampling fraction $$\left(\frac{k}{N}\right),$$

N is a number of rows that have a column A in a relation R, and $S_{k,1}$ and $S_{k,2}$ are two independent uniform random samples of size k drawn from the relation R, if a overhead associated with the column is selected as the measure of strength;

estimating strength $|\hat{X}|$ of the column comprising the one or more default values as a key column based at least on a number of clean records within the column in the database by utilizing:

$$|\hat{X}| = |\hat{X}_{small}| + |\hat{X}_{large}|$$

wherein, $X_{small}$ is a set of "dirty" rows in a relation R that have either zero or one conflicting representative tuple pairs in a set of tuples S, and $X_{large}$ corresponds to a set of "dirty" rows that have more than one conflicting pair represented in S, if a row strength computation is selected as the measure of strength;

calculating an estimate of strength of a column as a key column as a function of the received samples utilizing the overhead calculator component or the row strength computation component based at least on the selection.

12. The method of claim 11, further comprising:
determining size of the database; and
determining one of a number and size of the samples based at least in part upon the determined size.

13. The method of claim 11, further comprising:
computing a sampling fraction; and
estimating strength of the column as a key column based at least in part upon the computed sampling fraction.

14. The method of claim 11, further comprising:
defining a threshold amount of error tolerance that can be associated with the estimated strength; and
determining one of a number and size of the samples based at least in part upon the defined threshold.

* * * * *